(No Model.)

G. T. WARWICK.
BICYCLE.

No. 386,097. Patented July 10, 1888.

Witnesses.
J. D. Garfield
G. M. Chamberlain

Inventor.
George T. Warwick
By his Attorney

UNITED STATES PATENT OFFICE.

GEORGE T. WARWICK, OF SPRINGFIELD, MASSACHUSETTS, ASSIGNOR TO THE WARWICK CYCLE MANUFACTURING COMPANY, OF SAME PLACE.

BICYCLE.

SPECIFICATION forming part of Letters Patent No. 386,097, dated July 10, 1888.

Application filed September 5, 1887. Serial No. 248,792. (No model.)

*To all whom it may concern:*

Be it known that I, GEORGE T. WARWICK, a citizen of the United States, residing at Springfield, in the county of Hampden and State of Massachusetts, have invented new and useful Improvements in Bicycles, of which the following is a specification.

This invention relates to bicycles, the object being to improve the construction of bicycles as relates to certain detail parts thereof; and the invention consists in the peculiar construction and arrangement of said detail parts of the machine, all as hereinafter fully described, and pointed out in the claims.

Figure 1:
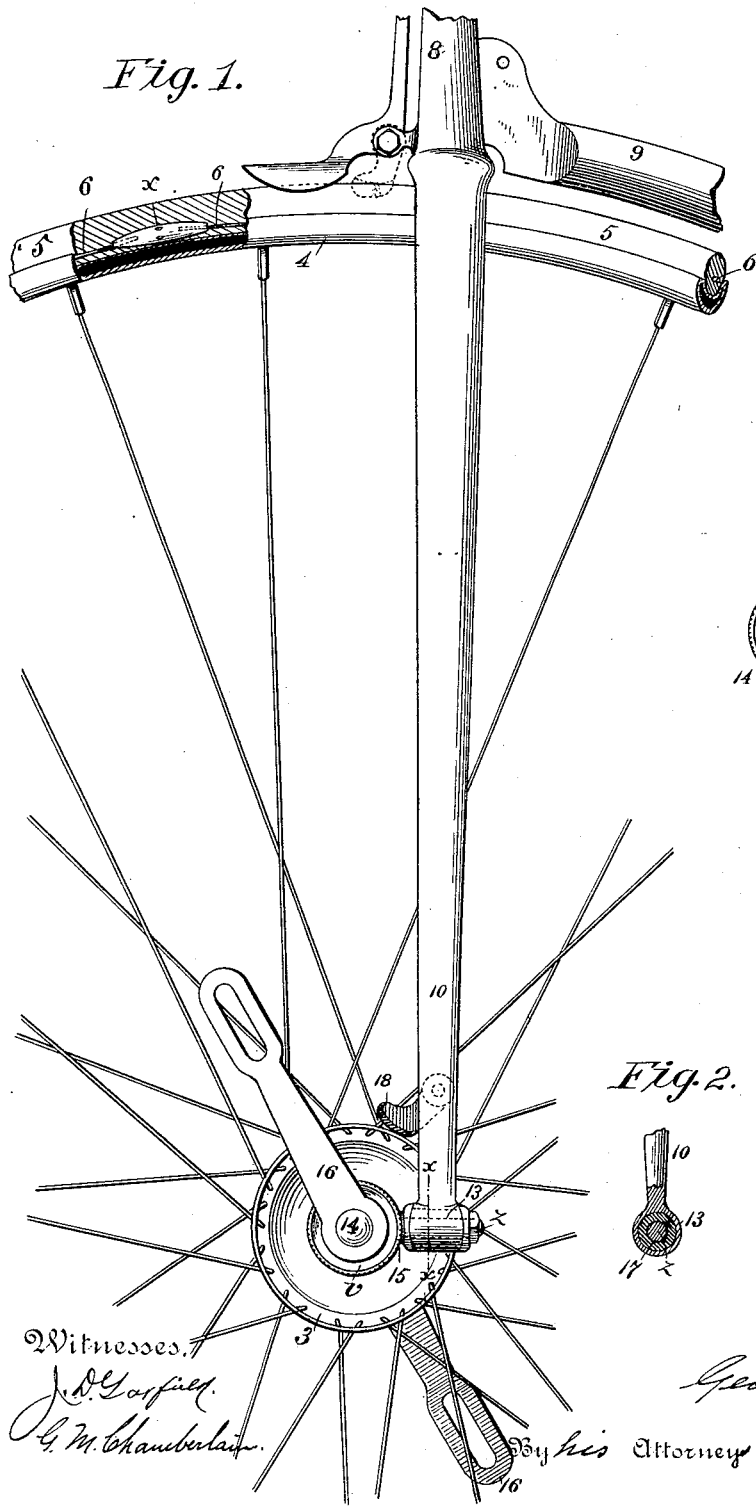
Figure 3:
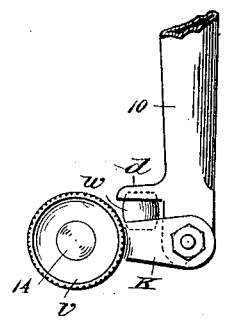
Figure 2:
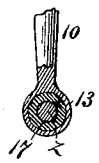

In the drawings forming part of this specification, Figure 1 is a side elevation of portions of a bicycle-wheel, the front fork thereof, the backbone, and the brake, having applied thereto my improvements. Fig. 2 is a sectional view of the lower end of one of the fork-legs. Fig. 3 is a side elevation of the lower end of one of the fork-legs, and illustrates, as below described, a modified construction of the parts which are shown in Fig. 1.

In the drawings, 3 indicates the hub of the bicycle-wheel, 4 the rim, and 5 the tire thereof, a segment only of the rim and tire of the wheel being shown in Fig. 1, and a few of the wheel-spokes being shown between the rim and the hub, other spokes of the wheel connected by one end with the hub and their opposite ends broken off. The rubber tire 5 is made, preferably, of a single piece of rubber of sufficient length to encircle the rim of the wheel and have its ends meet when placed thereon, as at *x*, Fig. 1, although said tire may be made in several pieces, if desired.

An improved connection for attaching the lower end of the fork-leg to the axle is herein provided, the purpose of which is to carry the wheel axle somewhat forward of the fork-legs, thereby greatly lessening the danger from "headers," and to provide an improved elastic connection between the fork and the axle, which also contributes to prevent headers, and whereby much of the shock which is experienced when the wheel strikes an obstruction on the road is obviated and the machine rides with much greater ease and comfort. The said fork-leg connection is constructed as follows: In the drawings, 8 indicates a portion of the fork-head near the wheel-tire, 9 the end of the backbone directly connected with said head, and 10 one of the fork-legs. The usual brake-shoe, 12, is shown pivoted to the front side of the fork-head, the upper end of the latter, as well as of the arm of said shoe, being shown broken off. The lower end of the fork-leg 10 has a sleeve, 13, thereon, standing at right angles to the axis of the wheel-axle 14. A bracket, 15, having a perforated circular disk-shaped head, *v*, and a laterally-projecting arm, *z*, is fitted on the axle 14 by the side of the hub 3 of the wheel, said axle being free to rotate within the perforation in said bracket-head. The crank 16 is secured on the end of the axle 14, outside of the head of said bracket. The arm *z* of the bracket 15 is of smaller diameter than the interior of the sleeve 13 on the fork-leg, and a cylindrical bushing, 17, of firm rubber, is placed within the sleeve 13, through which the arm *z* of said bracket passes, as illustrated in Fig. 2, which shows a cross-section of said sleeve, bushing, and arm on the line *x x*, Fig. 1. A nut is screwed on the end of said arm, *z*, firmly securing the lower end of the fork to the bracket, but not so tightly screwed against the outer end of the sleeve as to retard the spring movement of the sleeve on said arm produced by the weight of the rider of the machine.

By means of the above-described bracket-connection of the fork-leg with the axle and the interposition of said rubber thimble between the bracket-arm and the sleeve 13, the fork is capable of vertical spring action, said bushing 17 constituting a spring between said sleeve and the arm of the bracket, whereby, when the bicycle is moving, a slight vibratory movement is effected between the bracket and the fork, the consequence of which is that a slight movement of the wheel within the fork in the direction of the plane of its rotation is the result, thereby obviating the effects of a rigid connection between the fork and the axle, as usually constructed; or, in other words, a spring is provided between the fork and the axle by means of said rubber bushing. Another result of said bracket construction is to cause the axle of the wheel to be brought to a position considerably forward of the fork-legs, thereby making it a much safer machine to ride upon, and to greatly lessen the danger that the rider will be thrown forward over the wheel when the latter rolls against some slight obstruction on the road.

In Fig. 3 is illustrated a modified construction of a bracket connection between the lower end of the fork-leg and the axle of the bicycle, by which substantially the same spring action is obtained as by the construction shown in Fig. 1; but the spring element is differently applied. In Fig. 3 is shown the same bracket-head $v$, but having an arm, K, to the end of which the lower end of the fork-leg is pivotally connected by a bolt, as shown, and on said leg is an arm, $d$, extending toward the axle 14 and in a line with the upper side of said arm K, and between the latter and said arm $d$ is interposed a rubber or other suitable spring, $w$. It will be seen that a weight applied vertically to the fork-leg 10 in Fig. 3 would cause the arm K to move downward; but the spring $w$, interposed between the parts as aforesaid, offers a flexible resistance to said downward movement of the arm K, and thereby substantially the same spring action is obtained as in the construction shown in Fig. 1.

What I claim as my invention is—

1. In combination with the axle of a bicycle, a bracket, 15, loosely hung on said axle, having an arm extending at right angles thereto, a fork-leg, 10, having a sleeve thereon to receive said arm, and a rubber bushing interposed between said arm and the interior of said sleeve, substantially as set forth.

2. In combination, the axle 14, a bracket hung loosely on said axle, having an arm extending at right angles thereto, the fork-leg 10, connected with said arm, and a spring interposed between the bracket-arm and said leg, substantially as set forth.

GEO. T. WARWICK.

Witnesses:
H. A. CHAPIN,
G. M. CHAMBERLAIN.